US012757173B2

(12) United States Patent
Leon Calvo et al.

(10) Patent No.: US 12,757,173 B2
(45) Date of Patent: Oct. 6, 2026

(54) TERMINAL DEVICE AND METHOD THEREIN FOR RESOURCE RESERVATION

(71) Applicant: Telefonaktiebolaget LM Ericsson (publ), Stockholm (SE)

(72) Inventors: Jose Angel Leon Calvo, Aachen (DE); Ricardo Blasco Serrano, Espoo (FI); Shehzad Ali Ashraf, Munich (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 18/271,874

(22) PCT Filed: Jan. 14, 2022

(86) PCT No.: PCT/EP2022/050712
§ 371 (c)(1),
(2) Date: Jul. 12, 2023

(87) PCT Pub. No.: WO2022/152826
PCT Pub. Date: Jul. 21, 2022

(65) Prior Publication Data

US 2024/0073875 A1 Feb. 29, 2024

(30) Foreign Application Priority Data

Jan. 15, 2021 (WO) ................ PCT/EP2021/050813

(51) Int. Cl.
*H04W 4/00* (2018.01)
*H04L 1/1812* (2023.01)
(Continued)

(52) U.S. Cl.
CPC ....... *H04W 72/0446* (2013.01); *H04L 1/1812* (2013.01); *H04W 72/25* (2023.01)

(58) Field of Classification Search
None
See application file for complete search history.

(56) References Cited

U.S. PATENT DOCUMENTS

2020/0008025 A1* 1/2020 Lee ........................ H04W 4/40
2021/0058907 A1* 2/2021 Fakoorian ............ H04L 1/1812

FOREIGN PATENT DOCUMENTS

EP 3567909 A1 11/2019

OTHER PUBLICATIONS

Author Unknown, "Technical Specification Group Radio Access Network; NR; Physical layer procedures for data (Release 16)," Technical Specification 38.214, Version 16.4.0, Dec. 2020, 3GPP Organizational Partners, 169 pages.

(Continued)

*Primary Examiner* — Zewdu A Beyen
(74) *Attorney, Agent, or Firm* — Withrow & Terranova, PLLC

(57) ABSTRACT

The present disclosure provides a method in a first terminal device. The method includes: initiating a first transmission on a first resource; reserving a second resource for a second transmission; and initiating the second transmission on the second resource. The first resource and the second resource are separated by at least a time gap to enable a second terminal device that is to reserve or has reserved the second resource to trigger a resource reselection in response to sensing the first transmission within the time gap.

20 Claims, 12 Drawing Sheets

(51) Int. Cl.
*H04W 72/0446* (2023.01)
*H04W 72/25* (2023.01)

(56) References Cited

OTHER PUBLICATIONS

Ericsson, "R1-1912599: Resource allocation for Mode-2 transmissions," 3GPP TSG-RAN WG1 Meeting #99, Nov. 18-22, 2019, Reno, Nevada, 24 pages.
Ericsson, "R1-2100687: Resource allocation mechanisms for power saving," 3GPP TSG-RAN WG1 Meeting #104-e, Jan. 26-Feb. 5, 2021, Electonic Meeting, 16 pages.
LG Electronics, "RP-193231: New WID on NR sidelink enhancement," 3GPP TSG RAN Meeting #86, Dec. 9-12, 2019, Sitges, Spain, 6 pages.
International Search Report and Written Opinion for International Patent Application No. PCT/EP2022/050712, mailed May 31, 2022, 15 pages.

* cited by examiner

TERMINAL DEVICE AND METHOD THEREIN FOR RESOURCE RESERVATION

This application is a 35 U.S.C. § 371 national phase filing of International Application No. PCT/EP2022/050712, filed Jan. 14, 2022, which claims the benefit of International Application No. PCT/EP2021/050813, filed Jan. 15, 2021, the disclosures of which are incorporated herein by reference in their entireties.

TECHNICAL FIELD

The present disclosure relates to communication technology, and more particularly, to a terminal device and a method therein for resource reservation.

BACKGROUND

The 3$^{rd}$ Generation Partnership Project (3GPP) has specified support in Long Term Evolution (LTE) for Proximity Services (ProSe) in Releases 12 and 13, targeting public safety use cases (e.g., first responders) as well as a small subset of commercial use cases (e.g., discovery). The main feature of ProSe was the introduction of Device-to-Device (D2D) communications using a sidelink (SL) interface. In Release 14 and Release 15, major changes were introduced to the LTE SL framework with the aim of supporting (vehicle-to-everything or vehicle-to-anything) V2X communications, where V2X collectively denotes communication between a vehicle and any other endpoint (e.g., a vehicle, a pedestrian, etc.). The feature targeted mostly basic V2X use cases such as day-1 safety, etc.

In Release 16, 3GPP worked on specifying the sidelink interface for the 5$^{th}$ Generation (5G) New Radio (NR). The NR sidelink in Release 16 mainly targets advanced V2X services, which can be categorized into four use case groups: vehicles platooning, extended sensors, advanced driving, and remote driving. The advanced V2X services require a new sidelink in order to meet the stringent requirements in terms of latency and reliability. The NR sidelink is designed to provide higher system capacity and better coverage, and to allow for an easy extension to support the future development of further advanced V2X services and other related services.

Given the targeted V2X services by NR sidelink, it is commonly recognized that groupcast/multicast and unicast transmissions are desired, in which the intended receiver of a message consists of only a subset of the vehicles in proximity to the transmitter (groupcast) or of a single vehicle (unicast). For example, in the platooning service there are certain messages that are only of interest to the members of the platoon, making the members of the platoon a natural groupcast. In another example, the see-through use case most likely involves only a pair of vehicles, for which unicast transmissions naturally fit. Therefore, NR sidelink not only supports broadcast as in LTE sidelink, but also groupcast and unicast transmissions. Like in LTE sidelink, the NR sidelink is designed in such a way that its operation is possible with and without network coverage and with varying degrees of interaction between terminal devices (or User Equipments (UEs)) and the network, including support for standalone, network-less operation.

SUMMARY

It is an object of the present disclosure to provide a terminal device and a method therein for resource reservation.

According to a first aspect of the present disclosure, a method in a first terminal device is provided. The method includes: initiating a first transmission on a first resource; reserving a second resource for a second transmission; and initiating the second transmission on the second resource. The first resource and the second resource are separated by at least a time gap to enable a second terminal device that is to reserve or has reserved the second resource to trigger a resource reselection in response to sensing the first transmission within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via Sidelink Control Information (SCI).

In an embodiment, the time gap may be larger than or equal to time required for the second terminal device to decode the reservation in the first transmission, identify a potential collision on the second resource, and/or trigger the resource reselection.

In an embodiment, the resource reselection may be triggered in a reevaluation or pre-emption procedure.

In an embodiment, the time gap may be dependent on a priority of the second transmission and/or a remaining packet delay budget for the second transmission.

In an embodiment, the second transmission may be a retransmission of the first transmission or another transmission.

In an embodiment, the first transmission may further include a reservation for a third resource for a third transmission subsequent to the second transmission, and a time spacing between the second transmission and the third transmission may be smaller than the time gap.

In an embodiment, the first transmission and the second transmission may be sidelink transmissions.

In an embodiment, the first terminal device may not be configured to sense, or may not be capable of sensing, Physical Sidelink Shared Channel (PSSCH) or Physical Sidelink Control Channel (PSCCH).

According to a second aspect of the present disclosure, a first terminal device is provided. The first terminal device includes an initiating unit configured to initiate a first transmission on a first resource. The first terminal device further includes a reserving unit configured to reserve a second resource for a second transmission. The initiating unit is further configured to initiate the second transmission on the second resource. The first resource and the second resource are separated by at least a time gap to enable a second terminal device that is to reserve or has reserved the second resource to trigger a resource reselection in response to sensing the first transmission within the time gap.

According to a third aspect of the present disclosure, a first terminal device is provided. The first terminal device includes a transceiver, a processor and a memory. The memory contains instructions executable by the processor whereby the first terminal device is operative to perform the method according to the above first aspect.

According to a fourth aspect of the present disclosure, a computer readable storage medium is provided. The computer readable storage medium has computer program instructions stored thereon. The computer program instructions, when executed by a processor in a first terminal device, cause the first terminal device to perform the method according to the above first aspect.

According to a fifth aspect of the present disclosure, a method in a first terminal device is provided. The method includes: initiating a first transmission on a first resource, and reserving a second resource for a second transmission. The first resource and the second resource are separated by at least a time gap to enable the first terminal device to receive a coordination message from a second terminal device within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via SCI.

In an embodiment, the method may further include: receiving the coordination message from the second terminal device.

In an embodiment, the coordination message may contain a request for a resource reselection or pre-emption at the first terminal device.

In an embodiment, the request may include a Negative Acknowledgement (NACK) associated with the reserving of the second resource.

In an embodiment, the coordination message may be carried via control signaling.

In an embodiment, the control signaling may include Physical Sidelink Feedback Channel (PSFCH) signaling.

In an embodiment, the first resource and the second resource may be separated by a time spacing that is larger than a time interval between the first transmission and a first PSFCH occasion following the first transmission, and smaller than a time interval between the first transmission and a second PSFCH occasion subsequent to the first PSFCH occasion.

In an embodiment, the method may further include, prior to receiving the coordination message: transmitting, to the second terminal device, a request for the coordination message.

In an embodiment, the method may further include: reselecting a third resource for the second transmission in response to receiving the coordination message.

In an embodiment, the second transmission may be a retransmission of the first transmission or another transmission.

In an embodiment, the retransmission may include a blind retransmission or a Hybrid Automatic Repeat reQuest (HARQ) based retransmission.

In an embodiment, when the retransmission is the HARQ based retransmission, the time gap may be larger than time required for the first terminal device to receive a HARQ Acknowledgement (ACK) or NACK associated with the first transmission.

In an embodiment, the HARQ ACK or NACK may be received in a same PSFCH as the coordination message.

In an embodiment, the time gap may be dependent on a priority of the second transmission and/or a Channel Busy Ratio (CBR) measurement.

In an embodiment, the first transmission and the second transmission may be sidelink transmissions.

In an embodiment, the first terminal device may not be configured to sense, or may not be capable of sensing, PSSCH or PSCCH.

According to a sixth aspect of the present disclosure, a first terminal device is provided. The first terminal device includes an initiating unit configured to initiate a first transmission on a first resource. The first terminal device further includes a reserving unit configured to reserve a second resource for a second transmission. The first resource and the second resource are separated by at least a time gap to enable the first terminal device to receive a coordination message from a second terminal device within the time gap.

According to a seventh aspect of the present disclosure, a first terminal device is provided. The first terminal device includes a transceiver, a processor and a memory. The memory contains instructions executable by the processor whereby the first terminal device is operative to perform the method according to the above fifth aspect.

According to an eighth aspect of the present disclosure, a computer readable storage medium is provided. The computer readable storage medium has computer program instructions stored thereon. The computer program instructions, when executed by a processor in a first terminal device, cause the first terminal device to perform the method according to the above fifth aspect.

According to a ninth aspect of the present disclosure, a method in a second terminal device is provided. The method includes: receiving a transmission from a first terminal device on a first resource and a reservation for a second resource for a retransmission by the first terminal device; and transmitting, to the first terminal device, a HARQ NACK and a coordination message. The HARQ NACK is associated with the transmission and the coordination message contains a request for a resource reselection or pre-emption at the first terminal device.

In an embodiment, the request may include a NACK associated with the reservation.

In an embodiment, the HARQ NACK and the coordination message may be transmitted in a same PSFCH.

In an embodiment, the transmission and the retransmission may be sidelink transmissions, and the first terminal device may not be configured to sense, or may not be capable of sensing, PSSCH or PSCCH.

According to a tenth aspect of the present disclosure, a second terminal device is provided. The second terminal device includes a receiving unit configured to receive a transmission from a first terminal device on a first resource and a reservation for a second resource for a retransmission by the first terminal device. The second terminal device further includes a transmitting unit configured to transmit, to the first terminal device, a HARQ NACK and a coordination message. The HARQ NACK is associated with the transmission and the coordination message contains a request for a resource reselection or pre-emption at the first terminal device.

According to an eleventh aspect of the present disclosure, a second terminal device is provided. The second terminal device includes a transceiver, a processor and a memory. The memory contains instructions executable by the processor whereby the second terminal device is operative to perform the method according to the above ninth aspect.

According to a twelfth aspect of the present disclosure, a computer readable storage medium is provided. The computer readable storage medium has computer program instructions stored thereon. The computer program instructions, when executed by a processor in a second terminal device, cause the second terminal device to perform the method according to the above ninth aspect.

With the embodiments of the present disclosure, a terminal device initiates a first transmission on a first resource and reserves a second resource for a second transmission. The first resource and the second resource are separated by at least a time gap to enable another terminal device that is to reserve or has reserved the second resource to trigger a resource reselection in response to sensing the first transmission within the time gap, or enable the first terminal device to receive a coordination message from a second terminal device within the time gap. In this way, resource collisions due to the terminal device's incapability of sensing transmissions from other terminal devices can be at least mitigated.

BRIEF DESCRIPTION OF THE DRAWINGS

The above and other objects, features and advantages will be more apparent from the following description of embodiments with reference to the figures, in which.

DETAILED DESCRIPTION

Figure 1:
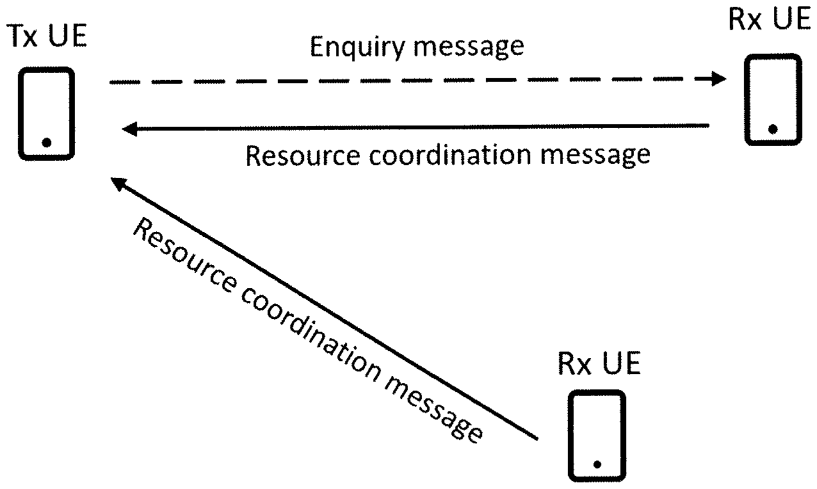
FIG. 1 is a schematic diagram showing an inter-UE resource coordination framework.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network.

Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network node to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In Release 17, 3GPP is working on multiple enhancements for the sidelink with the aim of extending the support for V2X and to cover other use cases such as public safety (see RP-193231, *New WID on NR sidelink enhancement,* 3GPP TSG RAN Meeting #86, Sitges, Spain, Dec. 9-12, 2019). Among these, improving the performance of power limited UEs (e.g., pedestrian UEs, first responder UEs, etc.) and improving the performance using resource coordination are considered critical.

Like in LTE sidelink, there are two resource allocation modes for NR sidelink:

Network-based resource allocation, in which the network selects the resources and other transmit parameters used by sidelink UEs. In some cases, the network may control every single transmission parameter. In other cases, the network may select the resources used for transmission but may give the transmitter the freedom to select some of the transmission parameters, possibly with some restrictions. In the context of NR SL, 3GPP refers to this resource allocation mode as Mode 1.

Autonomous resource allocation, in which the UEs autonomously select the resources and other transmit parameters. In this mode, there may be no intervention by the network (e.g., out of coverage, unlicensed carriers without a network deployment, etc.) or very minimal intervention by the network (e.g., configuration of pools of resources, etc.). In the context of NR SL, 3GPP refers to this resource allocation mode as Mode 2.

In the above Mode 2, distributed resource selection is employed, i.e., there is no central node for scheduling and UEs play the same role in autonomous resource selection. Mode 2 is based on two functionalities: reservation of future resources and sensing-based resource allocation. Reservation of future resources is done so that the UE transmitting a message also notifies the receivers about its intention to transmit using certain time-frequency resources at a later point in time. For example, a UE transmitting at time t informs the receivers that it will transmit using the same frequency resources at time t+100 ms. Resource reservation allows a UE to predict the utilization of the radio resources in the future. That is, by listening to current transmissions of another UE, it also obtains information about potential future transmissions. This information can be used by the UE to avoid collisions when selecting its own resources. Specifically, a UE predicts the future utilization of the radio resources by reading received booking messages and then schedules its current transmission to avoid using the same resources. This is known as sensing-based resource selection.

The sensing-based resource selection scheme specified in NR Release 16 can be roughly summarized in the following steps and defined in the Technical Specification (TS) 38.214, V16.4.0, which is incorporated herein by reference in its entirety.

A UE senses a transmission medium during an interval [n−a, n−b], where n is a time reference, and a>b≤0 define the duration of a sensing window. The length of the sensing window is (pre-)configurable.

Based on the sensing result, the UE predicts the future utilization of the transmission medium at a future time interval [n+$T_1$, n+$T_2$], where $T_2$>$T_1$≤0. The interval [n+$T_1$, n+$T_2$] is the resource selection window.

The UE selects one or more time-frequency resources among the resources in the selection window [n+$T_1$, n+$T_2$] that are predicted/determined to be selectable (e.g., idle, usable, available, etc.).

TS 38.214, Clause 8.1.4 specifies a UE procedure for determining the subset of resources to be reported to higher layers in PSSCH resource selection in sidelink resource allocation mode 2, as described below. More specifically, the sensing window is explicitly defined in Step 2, and the resource selection window corresponds to the time interval [n+$T_1$, n+$T_2$], as described in Step 1.

UE Procedure for Determining the Subset of Resources to be Reported to Higher Layers in PSSCH Resource Selection in Sidelink Resource Allocation Mode 2

In resource allocation mode 2, the higher layer can request the UE to deten line a subset of resources from which the higher layer will select resources for PSSCH/PSCCH transmission. To trigger this procedure, in slot n, the higher layer provides the following parameters for this PSSCH/PSCCH transmission:

- the resource pool from which the resources are to be reported;
- L1 priority, $prio_{TX}$;
- the remaining packet delay budget;
- the number of sub-channels to be used for the PSSCH/PSCCH transmission in a slot, $L_{subCH}$;
- optionally, the resource reservation interval, $P_{rsvp\_TX}$, in units of msec.
- if the higher layer requests the UE to determine a subset of resources from which the higher layer will select resources for PSSCH/PSCCH transmission as part of re-evaluation or pre-emption procedure, the higher layer provides a set of resources ($r_0$, $r_1$, $r_2$, . . . ) which may be subject to re-evaluation and a set of resources $$(r'_0, r'_1, r'_2, \ldots)$$

which may be subject to pre-emption.

it is up to UE implementation to determine the subset of resources as requested by higher layers before or after the slot $$r''_i - T_3, \text{ where } r''_i$$

is the slot with the smallest slot index among ($r_0$, $r_1$, $r_2$, . . . ) and $$(r'_0, r'_1, r'_2, \ldots),$$

and $T_3$ is equal to $$T^{SL}_{proc,1},$$

where $$T^{SL}_{proc,1}$$

is defined in slots in Table 8.1.4-2 where $\mu_{SL}$ is the SCS configuration of the SL BWP.

The following higher layer parameters affect this procedure:

- sl-SelectionWindowList: internal parameter $T_{2min}$ is set to the corresponding value from higher layer parameter sl-SelectionWindowList for the given value of $prio_{TX}$.
- sl-ThresPSSCH-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j$=$prio_{TX}$.
- sl-RS-ForSensing selects if the UE uses the PSSCH-RSRP or PSCCH-RSRP measurement, as defined in clause 8.4.2.1.
- sl-ResourceReservePeriodList
- sl-Sensing Window: internal parameter $T_0$ is defined as the number of slots corresponding to sl-Sensing Window msec
- sl-TxPercentageList: internal parameter X for a given $prio_{TX}$ is defined as sl-TxPercentageList ($prio_{TX}$) converted from percentage to ratio
- sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$ according to clause 8.1.7.

Notation $$(t^{SL}_0, t^{SL}_1, t^{SL}_2, \ldots)$$

denotes the set of slots which can belong to a sidelink resource pool and is defined in Clause 8.

$$(t'^{SL}_0, t'^{SL}_1, t'^{SL}_2, \ldots)$$

denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub-channel x+j in slot $$t'^{SL}_y$$

where j=0, . . . , $L_{subCH}-1$. The UE shall assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $$0 \le T_1 \le T^{SL}_{proc,1},$$

where $$T^{SL}_{proc,1}$$

is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \le T_2 \le$ remaining packet budget (in slots); otherwise $T_2$ is set to the remaining packet delay budget (in slots).

The total number of candidate single-slot resources is denoted by $M_{total}$.

2) The sensing window is defined by the range of slots $$[n - T_0, n - T^{SL}_{proc,0})$$

where $T_0$ is defined above and $$T^{SL}_{proc,0}$$

is defined in slots in Table 8.1.4-1 where $\lambda_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i, p_j)$ is set to the corresponding value of RSRP threshold indicated by the i-th field in sl-ThresPSSCH-RSRP-List, where $i=p_i+(p_j-1)*8$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $$t'^{SL}_{m}$$

in Step 2.

for any periodicity value allowed by the higher layer parameter sl-ResourceReservePeriodList and a hypothetical SCI format 1-A received in slot $$t'^{SL}_{m}$$

with ‘Resource reservation period’ field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:

a) the UE receives an SCI format 1-A in slot $$t'^{SL}_{m},$$

and ‘Resource reservation period’ field, if present, and ‘Priority’ field in the received SCI format 1-A indicate the values $P_{rsvp\_RX}$ and $prio_{RX}$, respectively according to Clause 16.4 in TS 38.213, V16.4.0;

b) the RSRP measurement performed, according to clause 8.4.2.1 for the received SCI format 1-A, is higher than $Th(prio_{RX}, prio_{TX})$;

c) the SCI format received in slot $$t^{SL}_{m}$$

or the same SCI format which, if and only if the ‘Resource reservation period’ field is present in the received SCI format 1-A, is assumed to be received in slot(s)

$$t^{SL}_{m+q\times P'_{rsvp\_RX}}$$

determines according to clause 8.1.5 the set of resource blocks and slots which overlaps with $$R_{x,y+j\times P'_{rsvp\_TX}}$$

for q=1, 2, . . . , Q and j=0, 1, . . . , $C_{reset}-1$. Here, $$P'_{rsvp\_RX}$$

is $P_{rsvp\_RX}$ converted to units of logical slots according to clause 8.1.7, $$Q = \left\lceil \frac{T_{scal}}{P_{rsvp\_RX}} \right\rceil$$

if $P_{rsvp\_RX} < T_{scal}$ and $$n' - m \le P'_{rsvp\_RX},$$

where $$t^{SL}_{n'} = n$$

if slot n belongs to the set $$\left(t_0^{SL}, t_1^{SL}, \ldots, t_{T_{max}}^{SL}\right),$$

otherwise slot $$t_{n'}^{SL}$$

is the first slot after slot n belonging to the set $$\left(t_0^{SL}, t_1^{SL}, \ldots, t_{T_{max}}^{SL}\right);$$

otherwise Q=1. $T_{scal}$ is set to selection window size $T_2$ converted to units of msec.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.

The output of the above procedure is a set $S_A$ of candidate resources that are suitable for transmission. To create a grant for transmission, the UE selects some resources from the set $S_A$ under the following restriction:

If sidelink HARQ feedback is used, any two selected resources must be separated at least by T seconds. This gap allows for the reception of the packet, transmission of sidelink HARQ feedback, and generation of a retransmission. The value of T depends on several parameters that are configured or preconfigured.

If sidelink HARQ feedback is not used, this restriction is not in place. That is, multiple transmissions of a packet may take place in consecutive slots.

Furthermore, in NR SL for Mode 2, re-evaluation and pre-emption mechanisms are also supported. Initially, a UE selects resources for multiple transmissions of one or more packets. This selection remains internal until the UE sends a control message that carries a reservation. At that point, the surrounding UEs become aware of the selection, which becomes indeed a reservation.

In the time interval between selection of the resources and transmission of a corresponding reservation, other UEs may reserve the same resources. To avoid such a collision, a UE is allowed to re-consider its selection. The purpose of such procedure is to evaluate if the earlier selected resources are still suitable for transmission or not. If a UE determines that the earlier selected resources are not suitable for its own transmission anymore (e.g., some other UE also selects the same resource in the meantime), it triggers the resource selection mechanism again. That is, a new set of candidate resources is created, and the resources are randomly selected from the newly created candidate resource set.

After a reservation has been sent, the UE cannot re-evaluate its selection anymore. However, it may still be prevented from transmitting on the reserved resources if other UEs have higher priority transmissions. In the mechanism known as pre-emption, a UE (re-)triggers the resource selection if another UE with a higher priority selects the same resource for its transmission. In this case, the UE with a low priority transmission (re-)triggers resource selection and a new set of candidate resource set is created/determined by the UE based on the sensing information.

FIG. 1 shows an inter-UE resource coordination framework. In this framework, a transmitter (Tx) UE receives a resource coordination message (with or without previously transmitting an enquiry message) to improve its own resource selection. Based on the resource coordination message, the Tx UE then performs resource (re-)selection. That is, based on the information the UE receives in the coordination message, it selects the (optimum) resources for its own transmission. In case the UE has already selected the resources, it may either keep the same resources as selected previously when they are still considered suitable for transmission or select other resources when the earlier selected resources are not suitable for transmission based on the received coordination message.

Moreover, the coordination message can either contain a set of resources (e.g., a resource map indicating suitable/unsuitable resources) which is referred as Map-based coordination message or a flag (e.g., one-bit signal) indicating the UE to perform a re-selection of the resources selected for transmission which is referred to as flag-based coordination message.

In NR SL Release 17 discussion, different types of UEs with respect to their SL reception capabilities have been defined and used as a basis for design of the power saving mechanisms and procedures, including:

Type-A UE: a SL UE that is not capable of performing reception of any SL signals and channels. However, there may be an exception of performing Physical Sidelink Feedback Channel (PSFCH) and Sidelink-Synchronization Signal/Physical Broadcast Channel (PBCH) Block (S-SSB) reception for Type-A UE. This type of UE can transmit S-SSB and SL signaling defined in Release 16, including PSSCH, PSCCH, PSFCH, and S-SSB.

Type-D UE: a SL UE that is capable of performing reception of all SL signals and channels defined in Release 16. In other words, this type of UE is able to receive and transmit all the defined SL signaling.

A UE that is not capable of performing reception of PSSCH and PSCCH, e.g., Type-A UE as described above, cannot perform the sensing operation in the above resource allocation Mode 2. Due to this limitation, such UE, also referred to as "non-sensing UE" herein, cannot perform re-evaluation and/or pre-emption operations for resources selected for transmission. Without the capability of re-evaluation and/or pre-emption, the likelihood of collisions would be higher, leading to degraded system performance.

Figure 2:
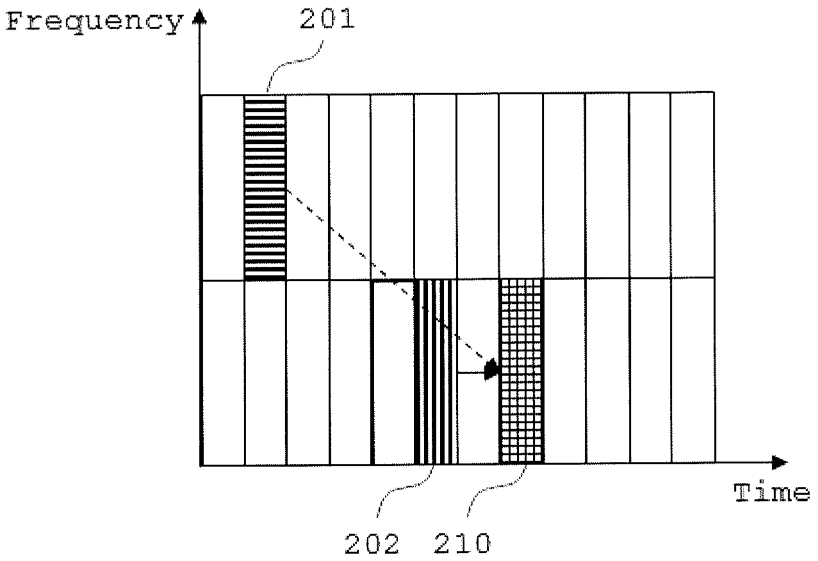
FIG. 2 is a schematic diagram showing a collision between resource allocations of a sensing UE and a non-sensing UE

FIG. 2 is a schematic diagram showing a collision between resource allocations of a sensing UE (a UE that is capable of performing reception of PSSCH and PSCCH and thus can perform the sensing operation in the above resource allocation Mode 2, e.g., Type-D UE) and a non-sensing UE (a UE that is not capable of performing reception of PSSCH and PSCCH and thus cannot perform the sensing operation in the above resource allocation Mode 2, e.g., Type-A UE). As shown, UE1, which is a sensing UE, selects two resources: Resource 201 for a first transmission, including a reservation (as shown by a dashed arrow) of Resource 210. A few slots later, UE2, which is a non-sensing UE and thus not aware of the reservation by UE1, selects two resources: Resource 202 for a first transmission, including a reservation (as shown by a solid arrow) of Resource 210. In this case, a collision between transmissions from UE1 and UE2 may occur on Resource 210.

Figure 3:
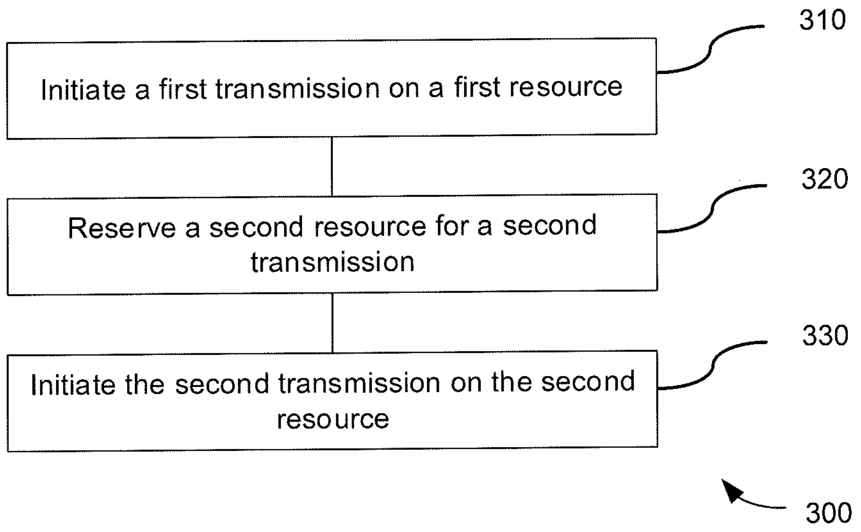
FIG. 3 is a flowchart illustrating a method in a first terminal device according to an embodiment of the present disclosure.

FIG. 3 is a flowchart illustrating a method 300 according to an embodiment of the present disclosure. The method 300 can be performed by a first terminal device, e.g., a non-sensing UE (such as Type-A UE). The first terminal device may not be configured to sense, or may not be capable of sensing, PSSCH or PSCCH.

At block 310, a first transmission is initiated on a first resource.

At block 320, a second resource is reserved for a second transmission. The first resource and the second resource are separated by at least a time gap to enable a second terminal device (e.g., a sensing UE, such as Type-D UE) that is to reserve or has reserved the second resource to trigger a resource reselection in response to sensing the first transmission within the time gap.

In an example, the first transmission and the second transmission may be e.g., sidelink transmissions. The second transmission may be a next transmission following the first transmission, or the first transmission and the second transmission may be consecutive transmissions. For example, the second transmission may be a retransmission of the first transmission or another transmission (which may be independent from the first transmission).

In an example, in the block 320, the second resource may be reserved by including a reservation for the second resource in the first transmission.

Alternatively, the second resource may be reserved by transmitting a reservation for the second resource on a sidelink control channel (e.g., via SCI over PSCCH).

For example, the time gap can be represented as $T_{min}$, in units of seconds, slots, Orthogonal Frequency Division Multiplexing (OFDM) symbols, or the like. For the first terminal device as a non-sensing UE, when the first resource is at time t1, the second resource shall not be selected to be earlier than $t1+T_{min}$.

In an example, the time gap ($T_{min}$) may be larger than or equal to time required for the second terminal device to decode the reservation in the first transmission, identify a potential collision on the second resource, and/or trigger the resource reselection. For example, the resource reselection may be triggered in a reevaluation or pre-emption procedure as described above.

In an example, the time gap ($T_{min}$) may be dependent on a priority of the second transmission, e.g., L1 priority, $prio_{TX}$, and/or dependent on a remaining packet delay budget for the second transmission (referring back to the above "UE procedure for determining the subset of resources to be reported to higher layers in PSSCH resource selection in sidelink resource allocation mode 2"). For example, the time gap ($T_{min}$) may be smaller for packets having higher priorities or having smaller remaining packet delay budgets.

At block 330, the second transmission is initiated on the second resource.

In an example, the first transmission may further include a reservation for a third resource for a third transmission (e.g., sidelink transmission) subsequent to the second transmission, and a time spacing between the second transmission and the third transmission may be smaller than the time gap. For example, when the first resource is at time t1, the second resource is at time t2, where $t2-t1 \geq T_{min}$, and the third resource is at time t3, where $t3>t2$ and $t3-t2<T_{min}$.

In another example, the time gap ($T_{min}$) may be applied between any reservation and the corresponding reserved resource. For example, when Resource K is reserved by Resource K1 and Resource K2, respectively, both the time spacing between Resource K1 and Resource K and the time spacing between Resource K2 and Resource K shall be larger than or equal to $T_{min}$.

The above method 300 will be further explained with reference to FIG. 4, which is a schematic diagram showing resource allocations of a sensing UE and a non-sensing UE, respectively, according to an embodiment of the present disclosure. As shown, UE1, which is a sensing UE, selects two resources: 4esource 201 for a first transmission, including a reservation (as shown by a dashed arrow) of Resource 410. A few slots later, UE2, which is a non-sensing UE and thus not aware of the reservation by UE1, selects two resources: Resource 402 for a first transmission, including a reservation (as shown by a solid arrow) of Resource 410. However, in this case, UE2 selects Resource 402 and Resource 410 in such a manner that they are separated by at least $T_{min}$, allowing UE1 to trigger a resource selection (reevaluation or pre-emption) upon sensing the reservation of Resource 410 by UE2. For example, UE1 may reselect (by means of reevaluation or pre-emption) Resource 420 so as to avoid the potential collision with UE2.

Figure 5:
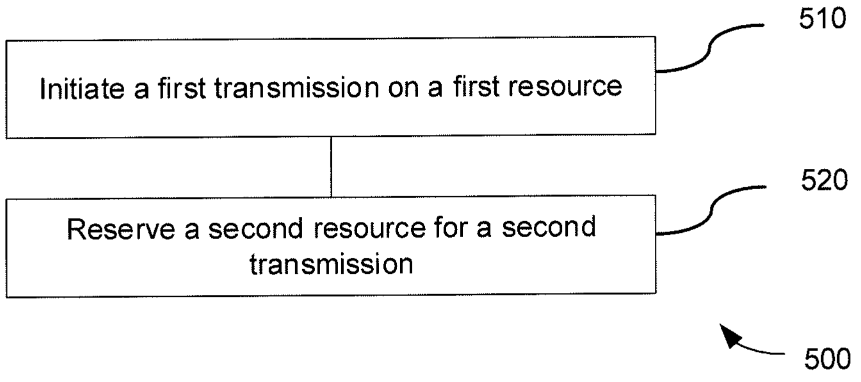
FIG. 5 is a flowchart illustrating a method in a first terminal device according to another embodiment of the present disclosure.

FIG. 5 is a flowchart illustrating a method 500 according to another embodiment of the present disclosure. The method 500 can be performed by a first terminal device, e.g., a non-sensing UE (such as Type-A UE). The first terminal device may not be configured to sense, or may not be capable of sensing, PSSCH or PSCCH.

At block 510, a first transmission is initiated on a first resource.

At block 520, a second resource is reserved for a second transmission. The first resource and the second resource are separated by at least a time gap (e.g., in units of seconds, slots, OFDM symbols, or the like) to enable the first terminal device to receive a coordination message from a second terminal device (e.g., a sensing UE, such as Type-D UE) within the time gap.

In an example, the first transmission and the second transmission may be e.g., sidelink transmissions. The second transmission may be a next transmission following the first transmission, or the first transmission and the second transmission may be consecutive transmissions. For example, the second transmission may be a retransmission (e.g., a blind retransmission or a HARQ based retransmission) of the first transmission or another transmission (which may be independent from the first transmission).

In an example, in the block 520, the second resource may be reserved by including a reservation for the second resource in the first transmission. Alternatively, the second resource may be reserved by transmitting a reservation for the second resource on a sidelink control channel (e.g., via SCI over PSCCH).

In an example, e.g., after the block 520, the first terminal device may receive the coordination message from the second terminal device. The coordination message may contain a request for a resource reselection or pre-emption at the first terminal device. For example, the coordination message may contain, as the request, a NACK associated with the reserving of the second resource.

Figure 6:
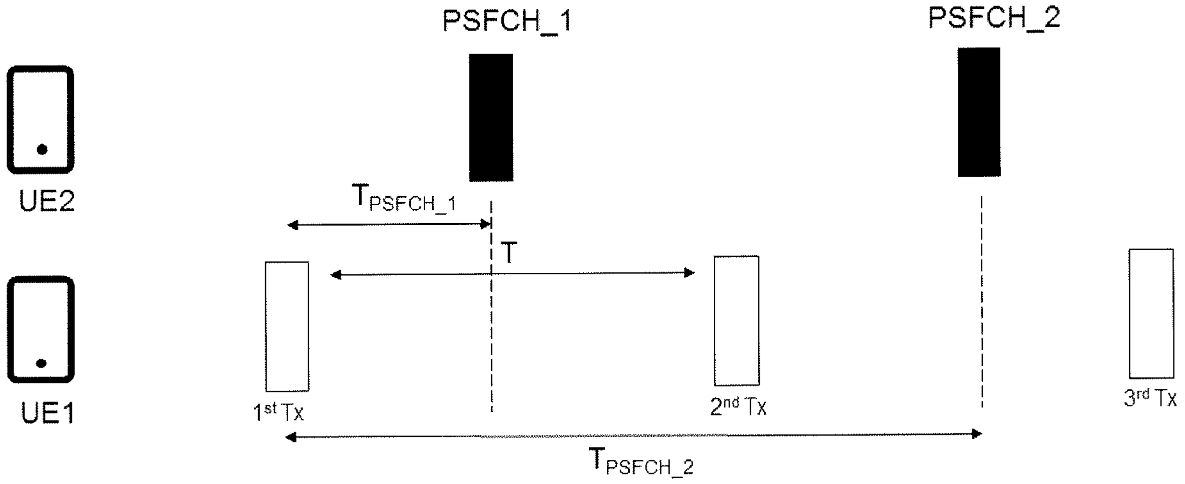
FIG. 6 is a schematic diagram showing a timing sequence of consecutive transmissions with respect to PSFCH occasions.

The coordination message may be carried via control signaling (e.g., PSFCH signaling). In this case, the first resource and the second resource may be separated by a time spacing that is larger than a time interval between the first transmission and a first PSFCH occasion following the first transmission, and smaller than a time interval between the first transmission and a second PSFCH occasion subsequent to the first PSFCH occasion. FIG. 6 is a schematic diagram showing a timing sequence of consecutive transmissions with respect to PSFCH occasions. As shown, the first terminal device (denoted as UE1 here) selects the resource for the first transmission ($1^{st}$ Tx) and the resource for the second transmission ($2^{nd}$ Tx) in such a manner that they are separated by T, where $T_{PSFCH\_1}<T<T_{PSFCH\_2}$, where $T_{PSFCH\_1}$ denotes a time interval between the first transmission and a first PSFCH occasion (PSFCH_1) immediately following the first transmission, and $T_{PSFCH\_2}$ denotes a time interval between the first PSFCH occasion (PSFCH_1) and a second PSFCH occasion (PSFCH_2) subsequent to the first PSFCH occasion (PSFCH_1).

When the second transmission is a HARQ based retransmission, the time gap may be larger than time required for the first terminal device to receive a HARQ ACK or NACK associated with the first transmission. In an example, the HARQ ACK or NACK may be received in a same PSFCH as the coordination message. For example, the PSFCH may contain two symbols/signals intended for the first terminal device:

- one for indicating whether a retransmission is needed, e.g., an ACK/NACK indicating whether the first transmission has been successfully received, and
- another one for indicating, when the retransmission is needed, whether resource reselection is needed at the first terminal device (e.g., a NACK indicating that a potential collision is detected and the first terminal device is required to reselect the resource for retransmission).

In an example, the time gap may be dependent on a priority of the second transmission and/or a Channel Busy Ratio, CBR, measurement. For example, the time gap may be smaller for packets having higher priorities or may be larger when the CBR measurement is higher (e.g., as the coordination message may take more time to arrive at the first terminal device when the channel is busier).

In an example, e.g., before receiving the coordination message, the first terminal device can transmit, to the second terminal device, a request for the coordination message. Here, the request may be the enquiry message as shown in FIG. 1. The request indicates that the first terminal device requests resource coordination associated with the second resource or the second transmission. In this case, the first terminal device monitors control signaling transmission (e.g., over PSFCH resources) between the enquiry message (or the first transmission) and the second transmission for the coordination message. On the other hand, when no request or enquiry message is transmitted, the first terminal device monitors control signaling transmission (e.g., over PSFCH resources) between the first transmission and the second transmission for the coordination message.

In response to receiving the coordination message, the first terminal device can reselect a third resource for the second transmission (e.g., in a pre-emption procedure). The third resource may be selected randomly.

Figure 7:
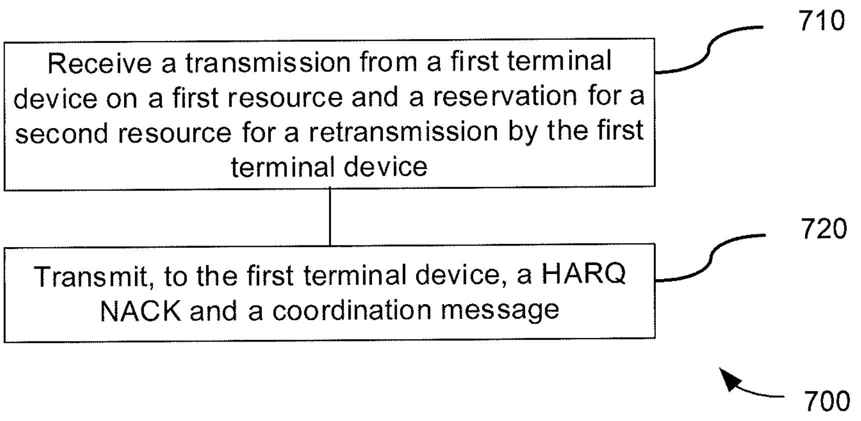
FIG. 7 is a flowchart illustrating a method in a second terminal device according to an embodiment of the present disclosure.

FIG. 7 is a flowchart illustrating a method 700 according to an embodiment of the present disclosure. The method 700 can be performed by a second terminal device, e.g., a sensing UE (such as Type-D UE).

At block 710, the second terminal device receives a transmission from a first terminal device on a first resource and a reservation for a second resource for a retransmission by the first terminal device. Here, the transmission and the retransmission may be sidelink transmissions, and the first terminal device may not be configured to sense, or may not be capable of sensing, PSSCH or PSCCH. That is, the first terminal device may be e.g., a non-sensing UE (such as Type-A UE).

At block 720, the second terminal device transmits, to the first terminal device, a HARQ NACK and a coordination message. Here, the HARQ NACK is associated with the transmission. The coordination message contains a request for a resource reselection or pre-emption at the first terminal device, e.g., when the second terminal device detects a potential collision with the first terminal device on the second resource. For example, the coordination message may contain, as the request, a NACK associated with the reservation. In an example, before transmitting the coordination message, the second terminal device may receive from the first terminal device a request for the coordination message. Here, the request may be the enquiry message as shown in FIG. 1.

In an example, the HARQ NACK and the coordination message may be transmitted in a same PSFCH.

Figure 8:
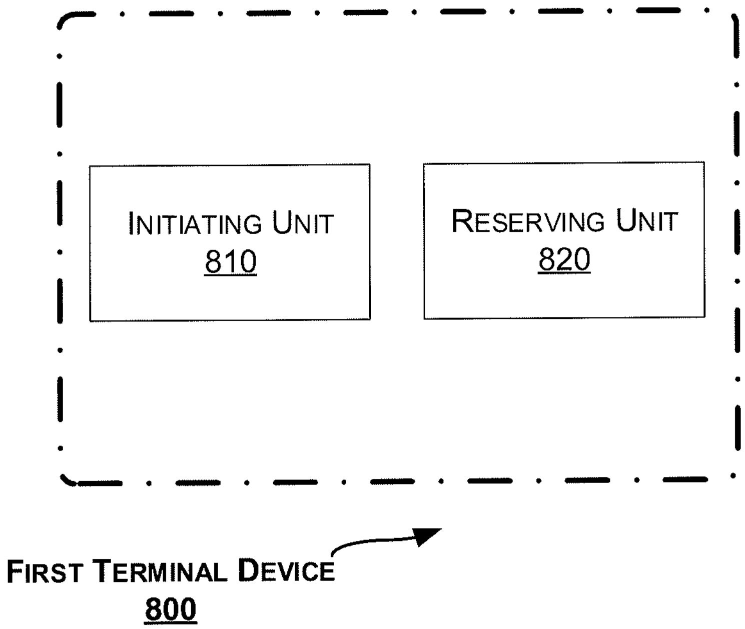
FIG. 8 is a block diagram of a first terminal device according to an embodiment of the present disclosure.

Correspondingly to the method 300 or 500 as described above, a first terminal device is provided. FIG. 8 is a block diagram of a first terminal device 800 according to an embodiment of the present disclosure.

The first terminal device 800 may be operative to perform the method 300 as described above in connection with FIG. 3. The first terminal device 800 may include an initiating unit 810 configured to initiate a first transmission on a first resource. The first terminal device 800 may further include a reserving unit 820 configured to reserve a second resource for a second transmission. The initiating unit 810 can be further configured to initiate the second transmission on the second resource. The first resource and the second resource are separated by at least a time gap to enable a second terminal device that is to reserve or has reserved the second resource to trigger a resource reselection in response to sensing the first transmission within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via SCI.

In an embodiment, the time gap may be larger than or equal to time required for the second terminal device to decode the reservation in the first transmission, identify a potential collision on the second resource, and/or trigger the resource reselection.

In an embodiment, the resource reselection may be triggered in a reevaluation or pre-emption procedure.

In an embodiment, the time gap may be dependent on a priority of the second transmission and/or a remaining packet delay budget for the second transmission.

In an embodiment, the second transmission may be a retransmission of the first transmission or another transmission.

In an embodiment, the first transmission may further include a reservation for a third resource for a third transmission subsequent to the second transmission, and a time spacing between the second transmission and the third transmission may be smaller than the time gap.

In an embodiment, the first transmission and the second transmission may be sidelink transmissions.

In an embodiment, the first terminal device may not be configured to sense, or may not be capable of sensing, PSSCH or PSCCH.

Alternatively, the first terminal device 800 may be operative to perform the method 300 as described above in connection with FIG. 5. The first terminal device 800 may include an initiating unit 810 configured to initiate a first transmission on a first resource. The first terminal device 800 may further include a reserving unit 820 configured to reserve a second resource for a second transmission. The first resource and the second resource are separated by at least a time gap to enable the first terminal device to receive a coordination message from a second terminal device within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via SCI.

In an embodiment, the first terminal device 800 may further include a receiving unit configured to receive the coordination message from the second terminal device.

In an embodiment, the coordination message may contain a request for a resource reselection or pre-emption at the first terminal device.

In an embodiment, the request may include a NACK associated with the reserving of the second resource.

In an embodiment, the coordination message may be carried via control signaling.

In an embodiment, the control signaling may include PSFCH signaling.

In an embodiment, the first resource and the second resource may be separated by a time spacing that is larger than a time interval between the first transmission and a first PSFCH occasion following the first transmission, and smaller than a time interval between the first transmission and a second PSFCH occasion subsequent to the first PSFCH occasion.

In an embodiment, the first terminal device 800 may further include a transmitting unit configured to transmit, to the second terminal device, a request for the coordination message.

In an embodiment, the first terminal device 800 may further include a reselecting unit configured to reselect a third resource for the second transmission in response to receiving the coordination message.

In an embodiment, the second transmission may be a retransmission of the first transmission or another transmission.

In an embodiment, the retransmission may include a blind retransmission or a HARQ based retransmission.

In an embodiment, when the retransmission is the HARQ based retransmission, the time gap may be larger than time required for the first terminal device to receive a HARQ ACK or NACK associated with the first transmission.

In an embodiment, the HARQ ACK or NACK may be received in a same PSFCH as the coordination message.

In an embodiment, the time gap may be dependent on a priority of the second transmission and/or a CBR measurement.

In an embodiment, the first transmission and the second transmission may be sidelink transmissions.

In an embodiment, the first terminal device may not be configured to sense, or may not be capable of sensing, PSSCH or PSCCH.

The units 810 and 820 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3 or 5.

Figure 9:
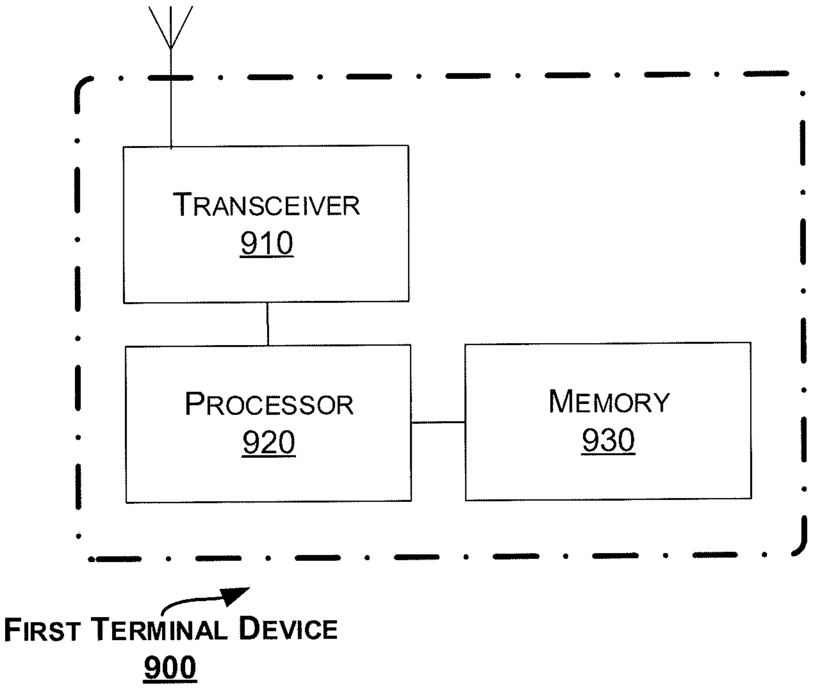
FIG. 9 is a block diagram of a first terminal device according to another embodiment of the present disclosure.

FIG. 9 is a block diagram of a first terminal device 900 according to another embodiment of the present disclosure.

The first terminal device 900 includes a transceiver 910, a processor 920 and a memory 930. The memory 930 may contain instructions executable by the processor 920 whereby the first terminal device 900 is operative to perform the actions, e.g., of the procedure described earlier in conjunction with FIG. 3. Particularly, the memory 930 contains instructions executable by the processor 920 whereby the first terminal device 900 is operative to: initiate a first transmission on a first resource; reserve a second resource for a second transmission; and initiate the second transmission on the second resource. The first resource and the second resource are separated by at least a time gap to enable a second terminal device that is to reserve or has reserved the second resource to trigger a resource reselection in response to sensing the first transmission within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via SCI.

In an embodiment, the time gap may be larger than or equal to time required for the second terminal device to decode the reservation in the first transmission, identify a potential collision on the second resource, and/or trigger the resource reselection.

In an embodiment, the resource reselection may be triggered in a reevaluation or pre-emption procedure.

In an embodiment, the time gap may be dependent on a priority of the second transmission and/or a remaining packet delay budget for the second transmission.

In an embodiment, the second transmission may be a retransmission of the first transmission or another transmission.

In an embodiment, the first transmission may further include a reservation for a third resource for a third transmission subsequent to the second transmission, and a time spacing between the second transmission and the third transmission may be smaller than the time gap.

In an embodiment, the first transmission and the second transmission may be sidelink transmissions.

In an embodiment, the first terminal device may not be configured to sense, or may not be capable of sensing, PSSCH or PSCCH.

The first terminal device 900 includes a transceiver 910, a processor 920 and a memory 930. The memory 930 may contain instructions executable by the processor 920 whereby the first terminal device 900 is operative to perform the actions, e.g., of the procedure described earlier in conjunction with FIG. 5. Particularly, the memory 930 contains instructions executable by the processor 920 whereby the first terminal device 900 is operative to: initiate a first transmission on a first resource, and reserve a second resource for a second transmission. The first resource and the second resource are separated by at least a time gap to enable the first terminal device to receive a coordination message from a second terminal device within the time gap.

In an embodiment, the second transmission may be a next transmission following the first transmission, or the first transmission and the second transmission may be consecutive transmissions.

In an embodiment, the second resource may be reserved by including a reservation for the second resource in the first transmission or transmitting a reservation for the second resource on a sidelink control channel.

In an embodiment, the operation of transmitting the reservation on the sidelink control channel may include transmitting the reservation via SCI.

In an embodiment, the memory 930 may further contain instructions executable by the processor 920 whereby the first terminal device 900 is operative to: receive the coordination message from the second terminal device.

In an embodiment, the coordination message may contain a request for a resource reselection or pre-emption at the first terminal device.

In an embodiment, the request may include a NACK associated with the reserving of the second resource.

In an embodiment, the coordination message may be carried via control signaling.

In an embodiment, the control signaling may include PSFCH signaling.

In an embodiment, the first resource and the second resource may be separated by a time spacing that is larger than a time interval between the first transmission and a first PSFCH occasion following the first transmission, and smaller than a time interval between the first transmission and a second PSFCH occasion subsequent to the first PSFCH occasion.

In an embodiment, the memory 930 may further contain instructions executable by the processor 920 whereby the first terminal device 900 is operative to: prior to receiving the coordination message: transmit, to the second terminal device, a request for the coordination message.

In an embodiment, the memory 930 may further contain instructions executable by the processor 920 whereby the first terminal device 900 is operative to:

reselect a third resource for the second transmission in response to receiving the coordination message.

In an embodiment, the second transmission may be a retransmission of the first transmission or another transmission.

In an embodiment, the retransmission may include a blind retransmission or a HARQ based retransmission.

In an embodiment, when the retransmission is the HARQ based retransmission, the time gap may be larger than time required for the first terminal device to receive a HARQ ACK or NACK associated with the first transmission.

In an embodiment, the HARQ ACK or NACK may be received in a same PSFCH as the coordination message.

In an embodiment, the time gap may be dependent on a priority of the second transmission and/or a Channel Busy Ratio (CBR) measurement.

In an embodiment, the first transmission and the second transmission may be sidelink transmissions.

In an embodiment, the first terminal device may not be configured to sense, or may not be capable of sensing, PSSCH or PSCCH.

Figure 10:
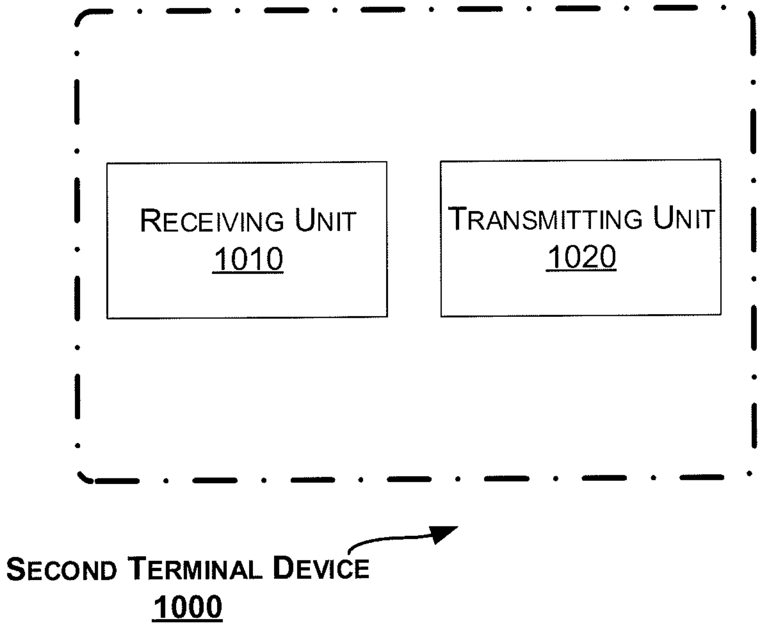
FIG. 10 is a block diagram of a second terminal device according to an embodiment of the present disclosure.

Correspondingly to the method 700 as described above, a second terminal device is provided. FIG. 10 is a block diagram of a second terminal device 1000 according to an embodiment of the present disclosure.

As shown in FIG. 10, the second terminal device 1000 includes a receiving unit 1010 configured to receive a transmission from a first terminal device on a first resource and a reservation for a second resource for a retransmission by the first terminal device. The second terminal device 1000 further includes a transmitting unit 1020 configured to transmit, to the first terminal device, a HARQ NACK and a coordination message. The HARQ NACK is associated with the transmission and the coordination message contains a request for a resource reselection or pre-emption at the first terminal device.

In an embodiment, the request may include a NACK associated with the reservation.

In an embodiment, the HARQ NACK and the coordination message may be transmitted in a same PSFCH.

In an embodiment, the transmission and the retransmission may be sidelink transmissions, and the first terminal device may not be configured to sense, or may not be capable of sensing, PSSCH or PSCCH.

The units 1010 and 1020 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 11:
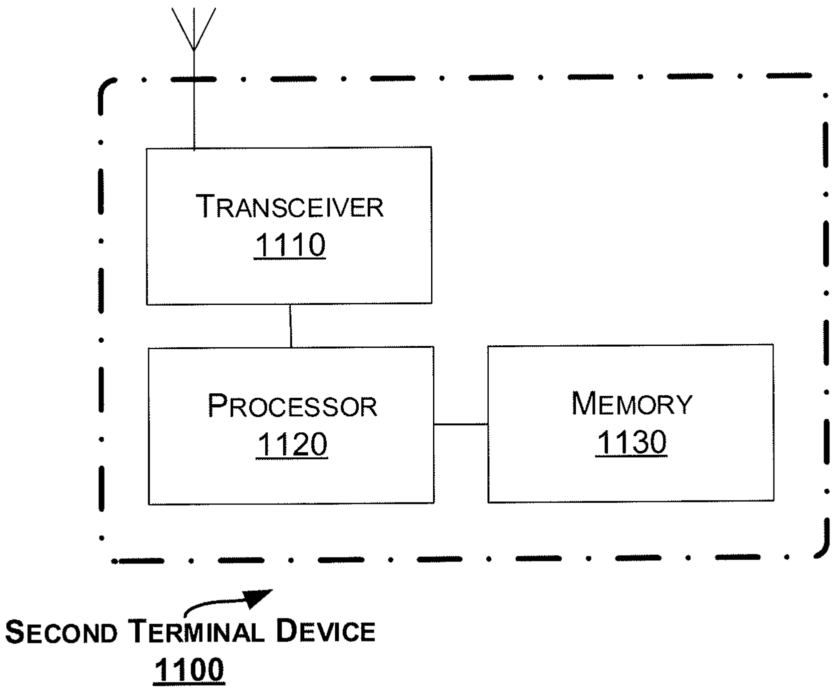
FIG. 11 is a block diagram of a second terminal device according to another embodiment of the present disclosure.

FIG. 11 is a block diagram of a second terminal device 1100 according to another embodiment of the present disclosure.

The second terminal device 1100 includes a transceiver 1110, a processor 1120 and a memory 1130. The memory 1130 may contain instructions executable by the processor 1120 whereby the second terminal device 1100 is operative to perform the actions, e.g., of the procedure described earlier in conjunction with FIG. 7. Particularly, the memory 1130 contains instructions executable by the processor 1120 whereby the second terminal device 1100 is operative to: receive a transmission from a first terminal device on a first resource and a reservation for a second resource for a retransmission by the first terminal device; and transmit, to the first terminal device, a HARQ NACK and a coordination message. The HARQ NACK is associated with the transmission and the coordination message contains a request for a resource reselection or pre-emption at the first terminal device.

In an embodiment, the request may include a NACK associated with the reservation.

In an embodiment, the HARQ NACK and the coordination message may be transmitted in a same PSFCH.

In an embodiment, the transmission and the retransmission may be sidelink transmissions, and the first terminal device may not be configured to sense, or may not be capable of sensing, PSSCH or PSCCH.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the first terminal device 900 to perform the actions, e.g., of the procedure described earlier in conjunction with FIG. 3 or 5; or code/computer readable instructions, which when executed by the processor 1120 causes the second terminal device 1100 to perform the actions, e.g., of the procedure described earlier in conjunction with FIG. 7.

The computer program product may be configured as a computer program code structured in computer program modules. The computer program modules could essentially perform the actions of the flow illustrated in FIG. 3, 5, or 7.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 12:
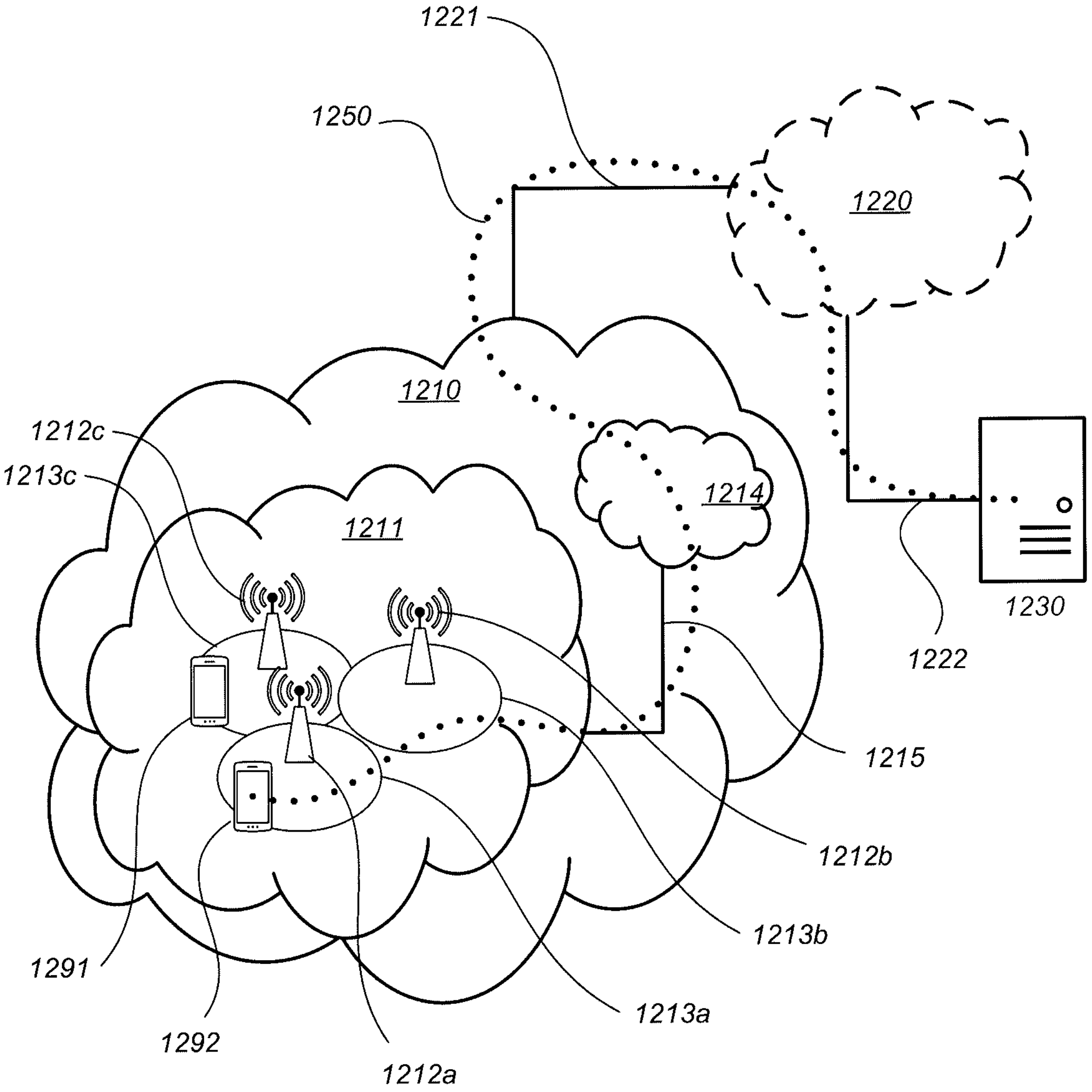
FIG. 12 schematically illustrates a telecommunication network connected via an intermediate network to a host computer.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to the core network 1214 over a wired or wireless connection 1215. A first UE 1291 located in a coverage area 1213*c* is configured to wirelessly connect to, or be paged by, the corresponding base station 1212*c*. A second UE 1292 in a coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. An intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises a processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes a processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes a processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
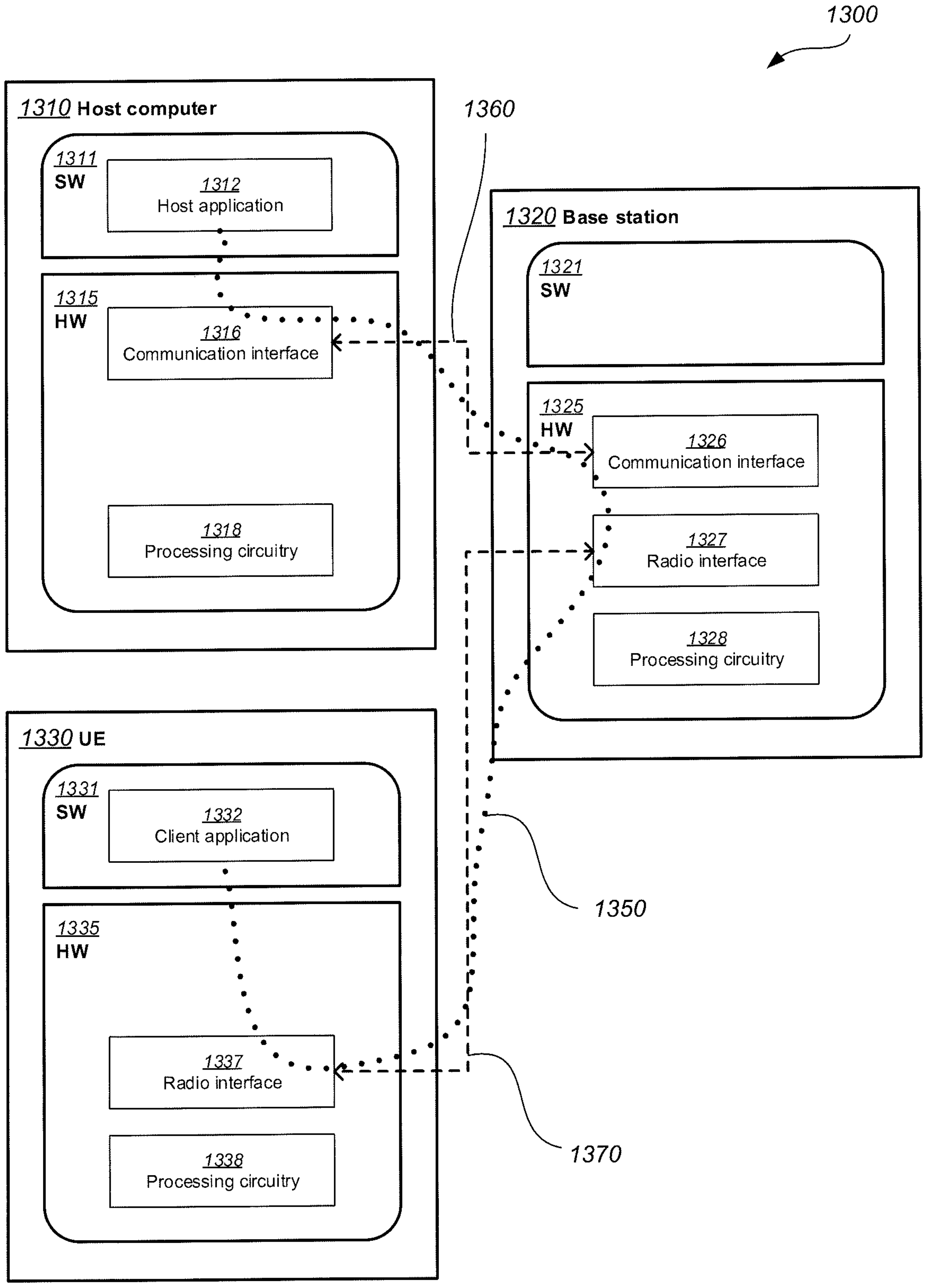
FIG. 13 is a generalized block diagram of a host computer communicating via a base station with a user equipment over a partially wireless connection.

It is noted that the host computer 1310, the base station 1320 and the UE 1330 illustrated in FIG. 13 may be similar or identical to the host computer 1930, one of base stations 1912*a*, 1912*b*, 1912*c* and one of UEs 1991, 1992 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve data rate and latency, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in software 1311 and hardware 1315 of the host computer 1310 or in software 1331 and hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency and the like. The measurements may be implemented in that the software 1311 and 1331 causes messages to be transmitted, in particular empty or 'dummy' messages, using the OTT connection 1350 while it monitors propagation times, errors etc.

Figure 14:
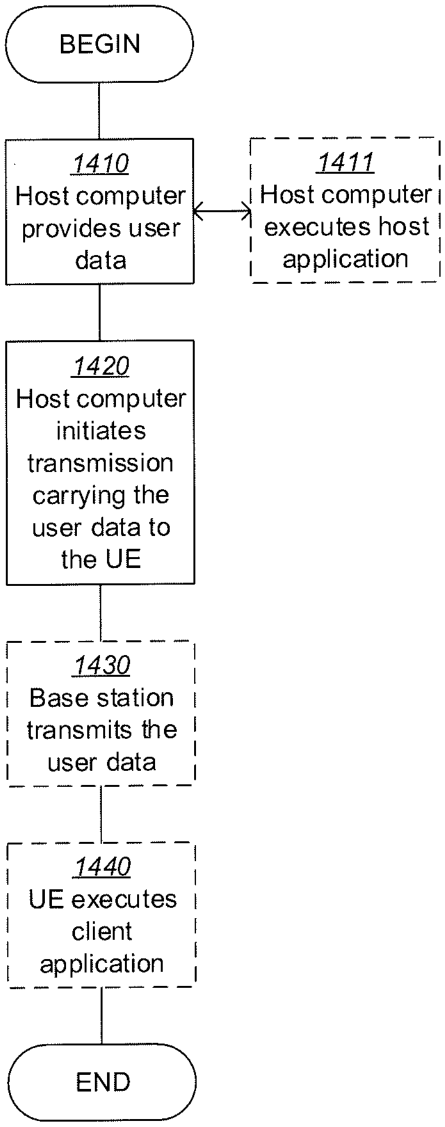
FIGS. 14 to 17 are flowcharts illustrating methods implemented in a communication system including a host computer, a base station and a user equipment.

FIG. 14 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
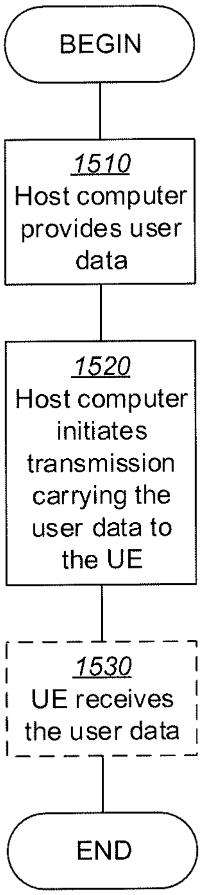

FIG. 15 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
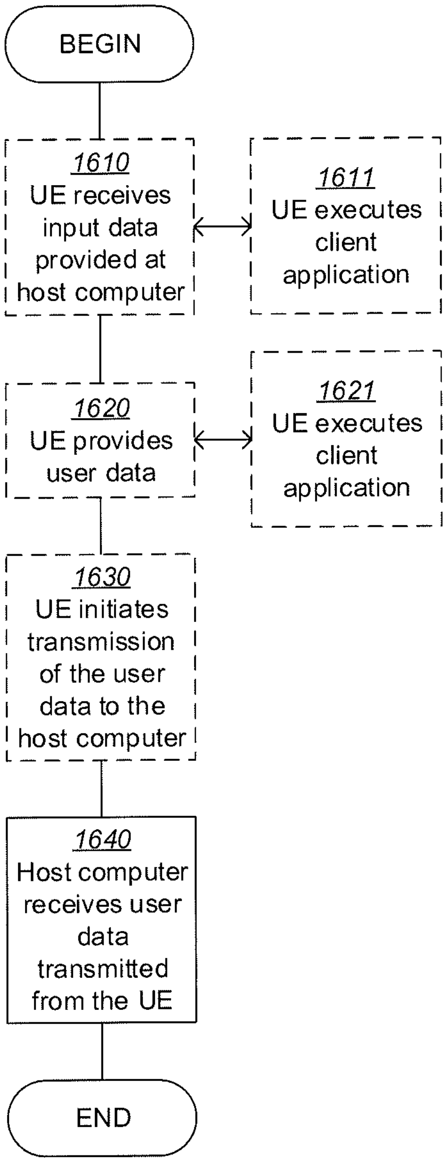

FIG. 16 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
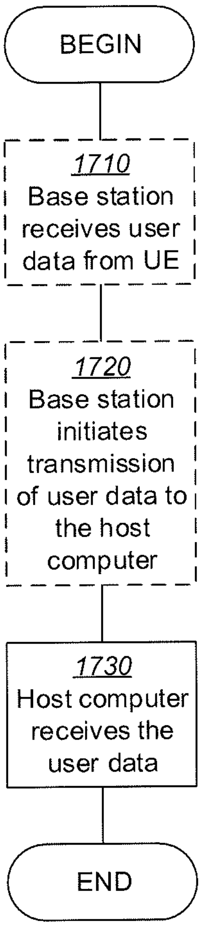

FIG. 17 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further includes the following embodiments.

This disclosure includes methods to enable re-evaluation/re-selection and/or pre-emption for resource allocation when some of the UEs in the scenario are not performing sensing operations. That is, when some of the UEs do not to detect themselves the conditions for triggering re-evaluation/reselection or pre-emption. We have two sorts of methods:

- Methods that ensure that a non-sensing UE selects resources in a way that allows other UEs, which perform sensing, to use re-evaluation/reselection and/or pre-emption to mitigate collisions with the non-sensing UE.
- Methods that allow a non-sensing UE to perform re-evaluation/re-selection and/or pre-emption based on inter-UE coordination messages transmitted by other UEs.

We present this in two separate parts.

Note: Even though in this disclosure, we focus in 3GPP technology (NR SL) and terminology, most of the embodiments are, in general, applicable to any kind of direct communications between UEs involving device-to-device (D2D) communications such as LTE SL or other IEEE based technologies.

Part 1: Methods that ensure that a non-sensing UE selects resources in a way that allows other UEs, which perform sensing, to use re-evaluation/reselection and/or pre-emption to mitigate collisions with the non-sensing UE.

This method consists in a rule for restricting the choice of resources for consecutive transmissions in a way that ensures that they are sufficiently separated in time to allow other UEs to perform re-evaluation/reselection and/or pre-emption.

FIG. 2 illustrates the problem to be addressed here. A first UE selects two resources. The first selected resource (marked with horizontal stripes) is used for a first transmission, including a reservation (dashed arrow) of the second selected resource. A few slots later, a second UE, that does not perform sensing and thus is not aware of the reservation from the first UE, selects two resources. The second selected resource by the second UE is the same as the second selected resource by the first UE (checked, i.e. both vertical and horizontal stripes). The second UE transmits in the first selected resource (marked with vertical stripes), including a reservation (solid arrow) of the second selected resource. Since the time gap between both resources selected by the second UE is below the minimum time for procession re-evaluation/pre-emption, the first UE cannot react. Thus, a collision takes place.

In one embodiment, the minimum separation (in time) between consecutive resources to be used for transmission of a packet depends on the resource allocation procedure. For example, if sensing is not used (e.g., a type-A UE selecting resources), then two consecutive transmissions must be separated by $T_{min}$ time units (e.g., seconds, slots, OFDM symbols, etc.). For example, consider a non-sensing UE, e.g., type-A UE, selecting two resources for the transmission of a packet:

- The first selected resource is at time t=n.
- The second resource cannot be selected at a time earlier than $t=n+T_{min}$.
- The first transmission includes a reservation, indicating that the UE intends to perform a retransmission using the second resource.

$T_{min}$ is the minimum time that a second UE requires to decode reservation contained in the first transmission, identify a potential collision with the transmission in the second resource, and trigger re-evaluation/re-selection or pre-emption. (In the specification sometimes T3 is used to denote such time).

In one embodiment, the minimum separation is applied between any reserved resource and a corresponding reservation. That is if a resource K is reserved by resources K-2 and K-1, then the minimum of the separations between resource K-2 and K and resource K-1 and K must be equal to or larger than $T_{min}$. For example, consider a non-sensing UE, e.g., type-A UE, selecting three resources for the transmission of a packet:

- The first selected resource is at time t=n.
- The second resource is selected at time t=n+Ta, where $Ta \geq T_{min}$.
- The third resource is selected at time t=n+Tb, where Tb>Ta but $Tb-Ta<T_{min}$.
- The first transmission includes two reservations, indicating that the UE intends to perform a retransmission using the second resource and a retransmission using the third resource.

Thus, re-evaluation/re-selection and/or pre-emption for the second and third resources is enabled by the transmission in the first selected resource, which carries the corresponding reservations.

In one embodiment, the minimum separation is applied only to some of the selected resources (e.g., applied to the first 2 selected resources only).

In one embodiment, whether the minimum separation $T_{min}$ is applied and whether the value depends on the priority of the packet to be transmitted and/or on the packet delay budget. For example, latency-critical packets may be exempt from applying the minimum separation.

Figure 4:
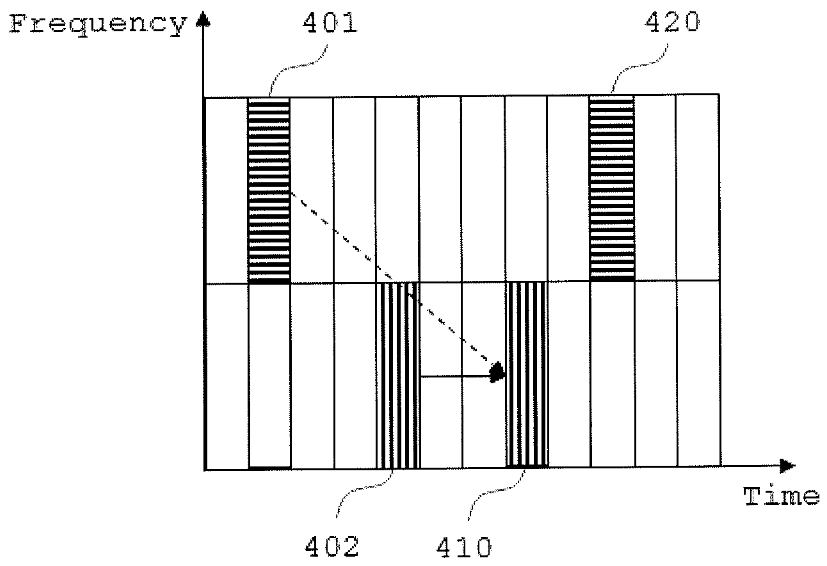
FIG. 4 is a schematic diagram showing resource allocations of a sensing UE and a non-sensing UE, respectively, according to an embodiment of the present disclosure.

FIG. 4 illustrates how the solution addresses the problem described earlier. A first UE selects two resources. The first selected resource (marked with horizontal stripes) is used for a first transmission, including a reservation (dashed arrow) of the second selected resource. A few slots later, a second UE, that does not perform sensing and thus is not aware of the reservation from the first UE, selects two resources. The second selected resource by the second UE is the same as the second selected resource by the first UE (checked, i.e. both vertical and horizontal stripes). The second UE transmits in the first selected resource (marked with vertical stripes), including a reservation (solid arrow) of the second selected resource. Since the time gap between both resources selected by the second UE is larger than the minimum time for procession re-evaluation/pre-emption, the first UE detects the potential collision. Its reaction is to skip its reserved resource and select a new one (marked also with horizontal stripes).

Part 2: Methods that allow a non-sensing UE to perform re-evaluation/re-selection and/or pre-emption based on inter-UE coordination messages transmitted by other UEs.

We describe methods to enable re-selection/re-evaluation and/or pre-emption for non-sensing UEs, e.g., Type-A UEs as defined above, using resource coordination messages from the neighboring UE(s). Based on some pre-defined or (pre-)configured set of rules, a non-sensing UE i.e., Tx UE, triggers re-selection/re-evaluation or pre-emption of the reserved resources, e.g., for HARQ-based (re-)transmissions or blind (re-)transmissions, upon receiving the resource coordination message(s) from the neighboring UE(s).

In one embodiment, a non-sensing UE, i.e., Tx UE, upon receiving a resource coordination message from a neighboring UE(s) triggers re-selection/pre-emption of the reserved resources, e.g., for a (re-)transmission(s) or consecutive transmissions.

In the following, we separate the embodiments based on the Tx UE transmission scheme, i.e., performing blind re-transmissions or HARQ-based re-transmissions.

Figure 18:
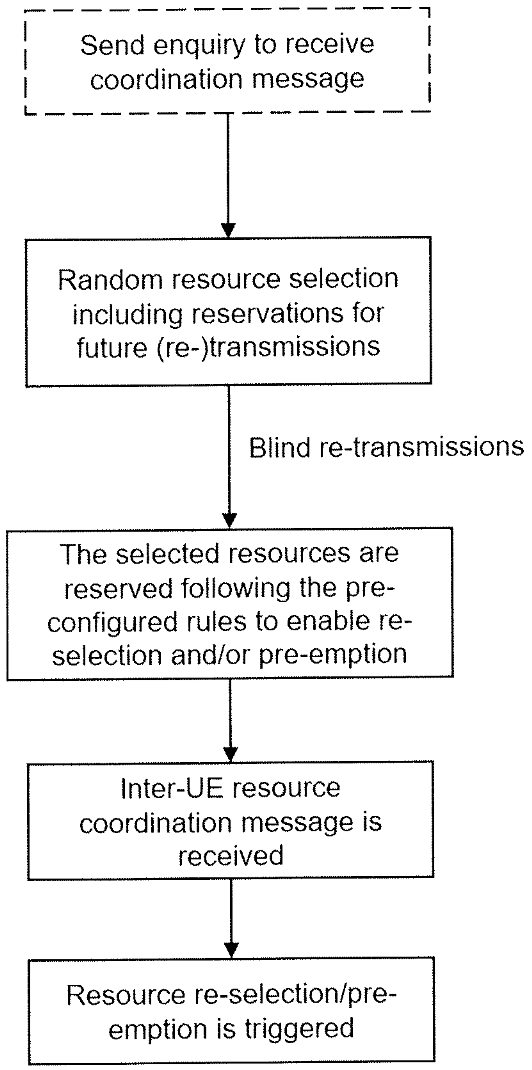
FIG. 18 is a flowchart illustrating a process for a non-sensing UE to perform blind retransmissions.

Embodiments Related to Resource Reservation Using Blind Re-Transmission Scheme The following set of rules and methods are intended for a non-sensing UE, i.e., TX UE, which reserves resources based on a blind (re-)transmission scheme. The steps are the following and a flowchart representing the steps is depicted in FIG. 18:

- Step 1 (Optional): the Tx UE sends an enquiry to receive coordination message for the next (re-)transmission(s).
- Step 2: the Tx UE selects resources for its initial transmission using random resource selection, i.e., select resources without sensing previously, for the next transmission and reserves, e.g., using the SCI, the next resources or the potential re-transmissions associated to the initial transmission.
- Step 2a: for the case of blind re-transmissions, i.e., not expecting HARQ feedback, the Tx UE reserves the re-transmissions based on a certain set of rules, e.g., distance between initial transmission and re-transmission, to allow for receiving the resource coordination message from other UEs.
- Step 3: the Tx UE receives the resource coordination message and based on its content performs re-selection and/or pre-emption of the resources, reserved using the initial transmission, for re-transmission.

In one embodiment, a Tx UE reserves the resources for the blind re-transmissions maintaining a pre-defined/pre-configured time gap T between the initial transmission i.e., random resource selection, and the subsequent re-transmissions which are reserved, e.g., using the initial transmission SCI. In a related embodiment, the time gap T is defined as the minimum time so that the Tx UE can receive control signaling, from the neighboring UEs that indicates to re-select the resources, e.g., Inter-UE resource coordination message contained in PSFCH, prior to the time slot allocated for the re-transmissions. In other words, the Tx UE must be able to receive the control signaling from other UE(s) before the re-transmission is scheduled.

In a related embodiment, the time gap T is configurable based on different parameters such as priority of the transmission or the CBR measurements. In another embodiment, in case of using PSFCH to carry the control signaling in the inter-UE coordination mechanism, the time gap T is upper bounded by the second PSFCH occasion in subsequent/next slots, i.e., $T_{PSFCH\_2}>T>T_{PSFCH\_1}$. In other words, each (re-)transmission is associated with the next PSFCH occasion. An example of the scheme using PSFCH to carry the inter-UE coordination message is given in FIG. 6, along with the associated timing restrictions.

In another embodiment, in case the Tx UE has triggered an enquiry associated to a transmission, i.e., a resource coordination message is wanted in relation with the following transmission, the Tx UE monitors for control signaling transmissions from other UE(s), e.g., PSFCH resources, which are allocated between the enquiry/initial transmission and the (re-)transmissions or consecutive transmissions.

In a related embodiment, the Tx UE monitors control signaling, e.g., PSFCH resources, between initial transmission and re-transmission under any condition, e.g., non-enquiry.

In one embodiment, the Tx UE upon receiving the coordination message indicating to re-select, e.g., a NACK in the PSFCH, between the initial transmission and the re-transmission, performs re-selection/pre-emption of the reserved resource. The new resource is selected in a random resource selection manner, i.e., without any sensing.

Figure 19:
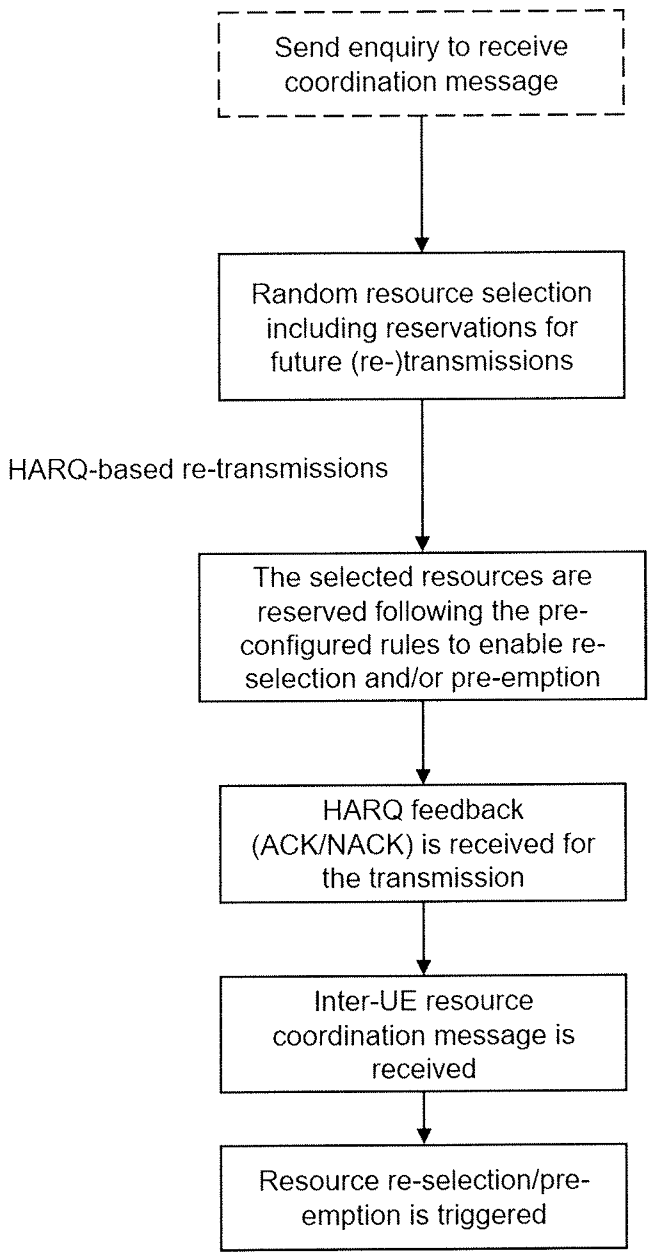
FIG. 19 is a flowchart illustrating a process for a non-sensing UE to perform HARQ based retransmissions.

Embodiments Related to Resource Reservation Using HARQ-Based Re-Transmission Scheme The following set of rules and methods are intended for a non-sensing UE, i.e., TX UE, which reserves resources based on a HARQ-based (re-)transmission scheme. The steps are the following and a flowchart representing the steps is depicted in FIG. 19:

- Step 1 (Optional): the Tx UE sends an enquiry to receive coordination message for the next (re-)transmission(s).
- Step 2: the Tx UE selects resources for its initial transmission using random resource selection, i.e., select resources without sensing previously, for the next transmission and reserves, e.g., using the SCI, the next potential re-transmissions associated to the initial transmission or a consecutive second transmission.
- Step 2b: for the case of HARQ-based re-transmissions, i.e., HARQ feedback (ACK/NACK) is expected, the Tx UE follows the rules defined in Rel-16 to reserve the next re-transmissions.
- Step 3: the Tx UE receives the resource coordination message and based on its content performs re-selection and/or pre-emption of the resources, reserved using the initial transmission, for the re-transmission or the consecutive reserved second transmission.

In another embodiment, the Tx UE re-selects/pre-empts the reserved resource for re-transmission or for a consecutive second transmission based on the resource coordination message, e.g., a NACK in the PSFCH, indicating to re-select or pre-empt the reserved resource. It is noteworthy, that in this scheme the control signaling, e.g., PSFCH, may contain at least two symbols/signals intended for the Tx UE:

- One symbol to indicate whether a re-transmission is needed, e.g., ACK/NACK of the initial transmission from the UE which has received the initial Tx.
- Signaling within the coordination message indicating whether in case of required re-transmission, the Tx UE has to re-select the reserved resource(s).

The Tx of this control signaling can be the UE receiving the initial Tx or any other peer UE which has sensed a collision.

Figure 20:
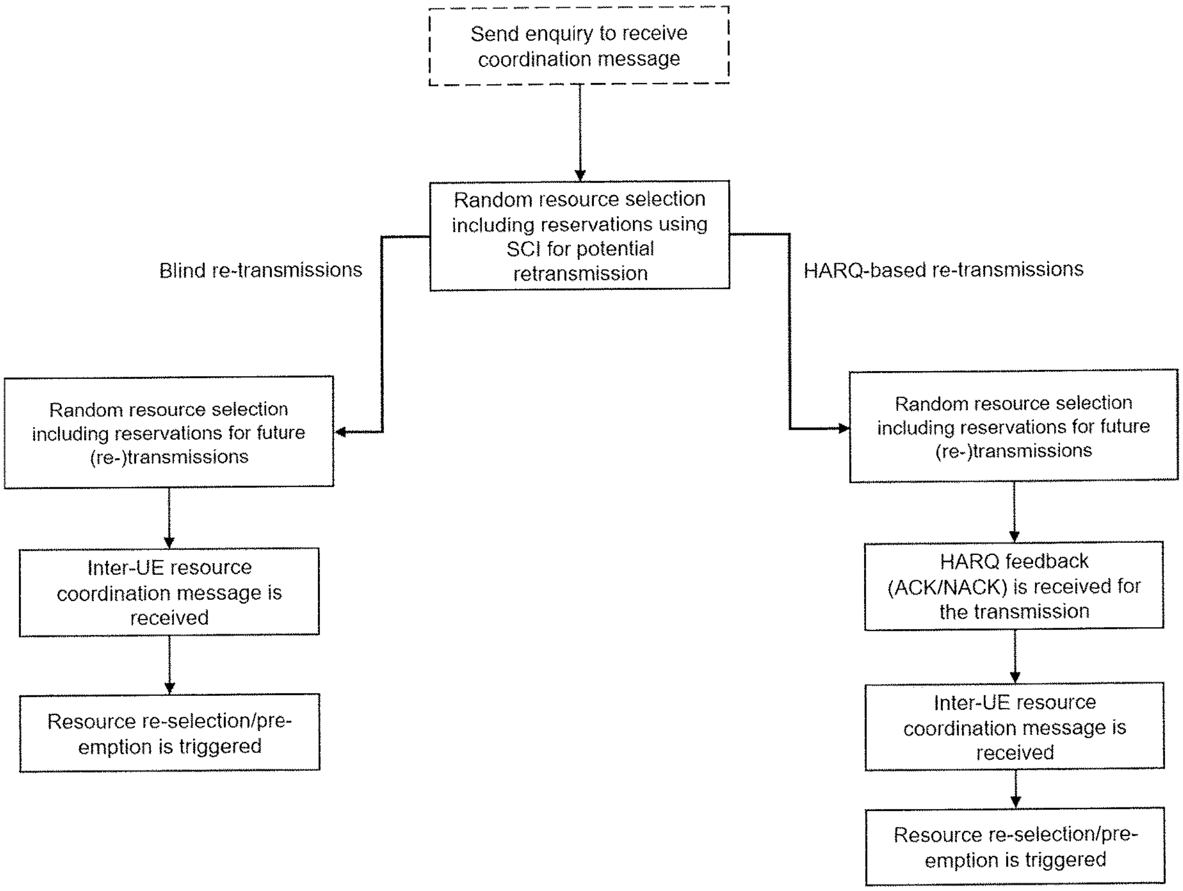
FIG. 20 is a flowchart illustrating a process for a non-sensing UE to perform blind or HARQ-based retransmissions.

As another example, a non-sensing UE could perform transmission(s) based on blind re-transmissions or transmission(s) which are HARQ-based re-transmissions, as shown in FIG. 20.

The main advantages of the here described embodiments are the following:

- Enable the possibility of re-selection/re-evaluation and/or pre-emption in non-sensing UE, reducing the likelihood of collisions among the peer UEs.
- Guarantee that sensing UEs are aware of the resource(s) chosen/selected by non-sensing UEs, and therefore, re-selection/re-evaluation and/or pre-emption can be performed by sensing UEs if needed.
- Reduce the overhead and/or extra signaling, e.g., resource re-selection, for sensing UEs when transmitting in a shared resource pool along with non-sensing UEs
- Enhance the overall system performance by reducing the amount of random resource selections.
- Common solution for blind and HARQ-based re-transmission for non-sensing UEs without adding any extra signaling.

The invention claimed is:

1. A method in a first terminal device, comprising:

initiating a first transmission on a first resource, and reserving a second resource for a second transmission, wherein the first resource and the second resource are separated by at least a time gap to enable the first terminal device to receive a coordination message from a second terminal device within the time gap;

the method further comprising:

receiving the coordination message from the second terminal device within the time gap.

2. The method of claim 1, wherein the second transmission is a next transmission following the first transmission, or the first transmission and the second transmission are consecutive transmissions.

3. The method of claim 1, wherein the second resource is reserved by including a reservation for the second resource in the first transmission or transmitting a reservation for the second resource on a sidelink control channel.

4. The method of claim 3, wherein said transmitting the reservation on the sidelink control channel comprising transmitting the reservation via Sidelink Control Information, SCI.

5. The method of claim 1, further comprising:

receiving the coordination message from the second terminal device.

6. The method of claim 1, wherein the coordination message contains a request for a resource reselection or pre-emption at the first terminal device.

7. The method of claim 6, wherein the request comprises a Negative Acknowledgement, NACK, associated with the reserving of the second resource.

8. The method of claim 1, wherein the coordination message is carried via control signaling.

9. The method of claim 8, wherein the control signaling comprises Physical Sidelink Feedback Channel, PSFCH, signaling.

10. The method of claim 9, wherein the first resource and the second resource are separated by a time spacing that is larger than a time interval between the first transmission and a first PSFCH occasion following the first transmission, and smaller than a time interval between the first transmission and a second PSFCH occasion subsequent to the first PSFCH occasion.

11. The method of claim 1, further comprising, prior to receiving the coordination message:

transmitting, to the second terminal device, a request for the coordination message.

12. The method of claim 1, further comprising:

reselecting a third resource for the second transmission in response to receiving the coordination message.

13. The method of claim 1, wherein the second transmission is a retransmission of the first transmission or another transmission.

14. The method of claim 13, wherein the retransmission comprises a blind retransmission or a Hybrid Automatic Repeat reQuest, HARQ, based retransmission.

15. The method of claim 14, wherein when the retransmission is the HARQ based retransmission, the time gap is larger than time required for the first terminal device to receive a HARQ Acknowledgement, ACK, or Negative Acknowledgement, NACK, associated with the first transmission.

16. The method of claim 15, wherein the HARQ ACK or NACK is received in a same PSFCH as the coordination message.

17. The method of claim 1, wherein the time gap is dependent on a priority of the second transmission and/or a Channel Busy Ratio, CBR, measurement.

18. The method of claim 1, wherein the first transmission and the second transmission are sidelink transmissions.

19. A method in a second terminal device, comprising:

receiving a transmission from a first terminal device on a first resource and a reservation for a second resource for a retransmission by the first terminal device; and transmitting, to the first terminal device, a Hybrid Automatic Repeat reQuest, HARQ, Negative Acknowledgement, NACK, and a coordination message, wherein the HARQ NACK is associated with the transmission and the coordination message contains a request for a resource reselection or pre-emption at the first terminal device;

wherein the coordination message is transmitted within a time gap the first resource and the second resource are separated by at least the time gap.

20. A first terminal device, comprising a transceiver, a processor and a memory, the memory comprising instructions executable by the processor whereby the first terminal device is operative to:

initiate a first transmission on a first resource, and reserve a second resource for a second transmission, wherein the first resource and the second resource are separated by at least a time gap to enable the first terminal device to receive a coordination message from a second terminal device within the time gap;

the first terminal device is further operative to:

receiving the coordination message from the second terminal device within the time gap.

* * * * *